United States Patent [19]

Masudaya

[11] Patent Number: 5,612,688
[45] Date of Patent: Mar. 18, 1997

[54] APPARATUS FOR SEARCHING FOR SENSED OBJECT

[75] Inventor: Hideki Masudaya, Miyagi-ken, Japan

[73] Assignee: Alps Electric Co., Ltd., Tokyo, Japan

[21] Appl. No.: 520,232

[22] Filed: Aug. 25, 1995

[30] Foreign Application Priority Data

Sep. 30, 1994 [JP] Japan ................................ 6-236935

[51] Int. Cl.⁶ ........................ G08G 1/123; G01C 21/00
[52] U.S. Cl. ................. 340/988; 340/573; 340/825.49; 340/825.36; 342/354; 342/457
[58] Field of Search ........................ 340/539, 988, 340/825.36, 825.49, 568, 572, 573; 364/424.02, 443, 444, 453, 449; 342/457, 357

[56] References Cited

U.S. PATENT DOCUMENTS 5,067,081  11/1991  Person .................................. 340/995
5,146,231  9/1992  Ghaem et al. ........................ 342/357
5,504,482  4/1996  Schreder ............................. 340/988

*Primary Examiner*—Donnie L. Crosland

[57] ABSTRACT

An apparatus for searching for a sensed object which is capable of immediately finding the direction in which a movable sensed object is present, from the contents displayed on an operation unit at hand. The searching apparatus includes a portable operation unit, an absolute direction sensor contained in the operation unit and generating an absolute direction signal which indicates an absolute direction, a removal sensor for automatically sensing a removal of the operation unit from the sensed object, a displacement sensor for sensing the state of displacement of the operation unit to generate displacement information, a controller generating direction indicating information which indicates the direction in which the sensed object is present, based on the displacement information and the absolute direction signal, a display for displaying contents of the direction indicating information; and a manual operation element for controlling the contents displayed on the display through the controller.

6 Claims, 2 Drawing Sheets

APPARATUS FOR SEARCHING FOR SENSED OBJECT

BACKGROUND OF THE INVENTION

1. Field of the Invention

The present invention relates to an apparatus for searching for a sensed object, and particularly to an apparatus for searching for a sensed object in which the direction to the present position of an object, e.g., a movable object such as an automobile, is displayed on a portable operation unit on the basis of the displacement locus of the operation unit after the operation unit is removed from the object.

2. Description of the Related Art

When an automobile is parked in an inexperienced place, when the driver leaves the parked automobile on business for a long time or goes relatively far away from the place where the automobile is parked, and when the driver returns to the place where the automobile is parked after the business is finished, in some cases, the place where the automobile is parked cannot be found, and the driver has difficulties in finding the parked automobile.

Such a state is frequently created when an automobile is parked in a strange large-scale parking lot, for example, when many temporary parking lots are separately located for persons to see events such as a sample fair, an exhibition and a festival, or when a driver parks an automobile in a multistory parking lot where many cars can be parked on each of stories and the driver runs the driver's own car in and out of the parking lot. This state is also created when an automobile is parked on a road in a place where roads are complicated, and there is nothing as a guide in the vicinity of the parked automobile.

When a driver loses sight of a place where the driver's own automobile is parked, as a matter of course, the driver must search for the place where the automobile is parked. When the driver searches for the place where the driver's own automobile is parked, if a search range is defined, the parking place can be searched for by spending time to some extent even if the search range is relatively wide. However, when the search range is not necessarily defined, for example, when one of a plurality of parking places where an automobile is parked is not found, as described above, or a story in a multistory parking place where the automobile is parked is not found, there occurs a serious situation in which much time is required for searching for the parking place.

It is also dangerous and obstructive of running of other automobiles to walk about a parking place for searching for the parked automobile.

SUMMARY OF THE INVENTION

The present invention has been achieved in consideration of the above-described situation, and an object of the invention is to provide an apparatus for searching for a sensed object which is capable of immediately finding the direction in which a movable sensed object is present, from contents displayed on an operation unit at hand.

In order to achieve the object, in accordance with an embodiment of the present invention, there is provided an apparatus for searching for a sensed object comprising an absolute direction sensor contained in a portable operation unit and generating an absolute direction signal which indicates an absolute direction; a removal sensor for sensing a removal of the operation unit from the sensed object; a displacement sensor for sensing the state of displacement of the operation unit after the operation unit is removed from the sensed object to generate displacement information; an arithmetic controller for generating direction indicating information which indicates the direction in which the sensed object is present, on the basis of the displacement information and absolute direction signal; and a display for displaying contents of the direction indicating information.

In accordance with another embodiment of the present invention, there is provided an apparatus for searching for a sensed object comprising an absolute direction sensor contained in a portable operation unit and generating an absolute direction signal which indicates an absolute direction; a removal sensor for automatically sensing a removal of the operation unit from the sensed object; a displacement sensor for sensing the state of displacement of the operation unit after the operation unit is removed from the sensed object to generate displacement information; an arithmetic controller for generating direction indicating information which indicates the direction in which the sensed object is present, based on the displacement information and the absolute direction signal; a display for displaying contents of the direction indicating information; and a manual operation element for controlling the contents displayed on the display through the controller.

In accordance with a further embodiment of the present invention, there is provided an apparatus for searching for a sensed object comprising an absolute direction sensor contained in a portable operation unit and generating an absolute direction signal which indicates an absolute direction; a charging battery serving as a power source of the operation unit; a displacement sensor for charging the charging battery when the operation unit is loaded on the sensed object provided with a charger and for sensing the state of displacement of the operation unit by operating a manual reset to generate displacement information; an arithmetic controller generating direction indicating information which indicates the direction in which the sensed object is present, on the basis of the displacement information and the absolute direction signal; and a display for displaying contents of the direction indicating information.

In accordance with a still further embodiment of the present invention, there is provided an apparatus for searching for a sensed object comprising an absolute direction sensor contained in a portable operation unit and generating an absolute direction signal indicating an absolute direction; a charging battery serving as a power source of the operation unit and having a terminal; a displacement sensor for charging the charging battery when the operation unit is loaded on the sensed object provided with a charger and for sensing the state of displacement of the operation unit by operating a manual reset to generate displacement information; an arithmetic controller generating direction indicating information which indicates the direction in which the sensed object is present, on the basis of the displacement information and the absolute direction signal; and a display for displaying contents of the direction indicating information; wherein when the terminal of the operation unit is removed from the charger of the sensed object, the voltage supplied from the charger is cut off to automatically return the coordinate position of the displacement sensor to an initial state.

In the above-described constructions, when an operator (a searcher of the sensed object, for example, the owner of an automobile) leaves the sensed object (for example, an automobile), if the operator has the operation unit, the removal sensor of the operation unit automatically senses a removal from the sensed object, and the displacement sensor successively senses the operation unit in the course of displacement thereof after the operation unit is removed from the sensed object to generate displacement information. The controller generates the direction indicating information which indicates the direction in which the sensed object is present relative to the operation unit, based on the absolute direction signal obtained from the absolute direction sensor and the displacement information obtained from the displacement sensor. The contents of the direction indicating information are displayed on the display. Thus, the operator (a searcher of the sensed object, for example, the owner of an automobile) can immediately know the direction in which the sensed object (for example, an automobile) is present (for example, the direction to a parking place) by seeing the contents of the displayed direction indicating information on the spot.

DESCRIPTION OF THE PREFERRED EMBODIMENTS

Embodiments of the present invention will be described in detail with reference to the drawings.

Figure 1:
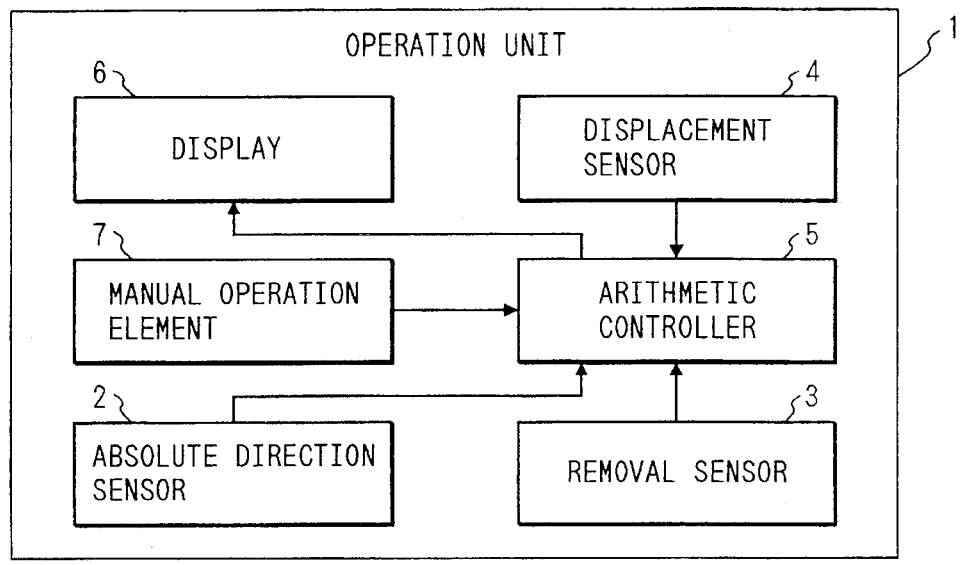
FIG. 1 is a block diagram showing an apparatus for searching for a sensed object in accordance with an embodiment of the present invention.

FIG. 1 is a block diagram showing an apparatus for searching for a sensed object in accordance with an embodiment of the present invention. In this embodiment, the sensed object is an automobile.

In FIG. 1, the apparatus for searching for a sensed object comprises a portable operation unit 1 which is generally carried by the owner of the automobile. The operation unit 1 contains an absolute direction sensor 2, a removal sensor 3, a displacement sensor 4, an arithmetic controller 5 comprising a microcomputer or an integrated circuit (IC), a display 6 comprising a liquid crystal element, and a manual operation element 7. In the operation unit 1, the arithmetic controller 5 is connected to the output terminals of the absolute direction sensor 2, the separation sensor 3, the displacement sensor 4 and the manual operation element 7 so that the arithmetic controller 5 displays positional information on the display 6 in accordance with the outputs from these elements. The positional information may be output as a speech by using a speech converter such as a speaker or the like in place of the liquid crystal display 6. In this embodiment, the absolute direction sensor 2 comprises a geomagnetic sensor, and the displacement sensor 4 comprises a displacement sensing member such as an acceleration sensor or a pendulum.

The apparatus for searching for the sensed object (automobile) constructed as described above is used when the operator cannot find a place where the operator's own automobile 50 was parked. In this case, the operator searches for the operator's own automobile 50, as described below.

Figure 3:
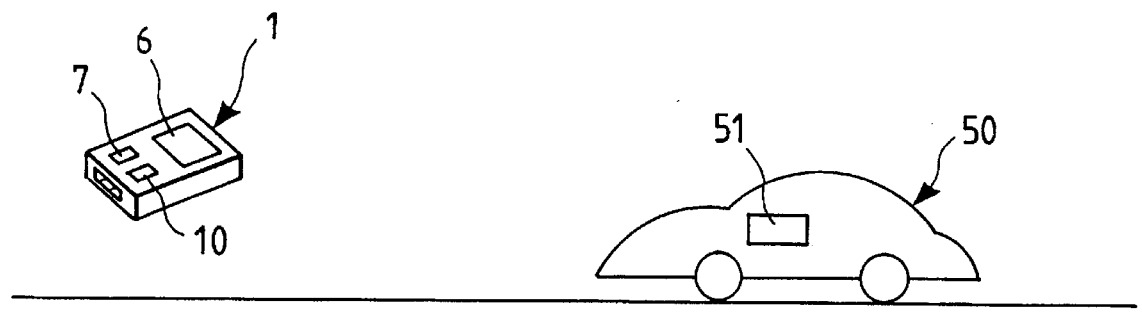
FIG. 3 is a drawing showing the relation between an operation unit and a sensed object in an apparatus for searching for a sensed object in an embodiment of the present invention.

When the owner of the automobile 50 parks the automobile 50 in a parking place and leaves the automobile 50, as shown in FIG. 3, the owner carries the portable operation unit 1. At this time, the removal sensor 3 of the operation unit 1 automatically senses removal of the operation unit 1 from the automobile 50 and generates a removal sensing signal which is then supplied to the arithmetic controller 5. The removal sensing signal can appropriately be generated. For example, the removal sensing signal may be generated when the operation unit 1 is removed from a predetermined storage place in the automobile 50, or when some signal constantly obtained in the automobile 50 is not sensed.

Figure 4:
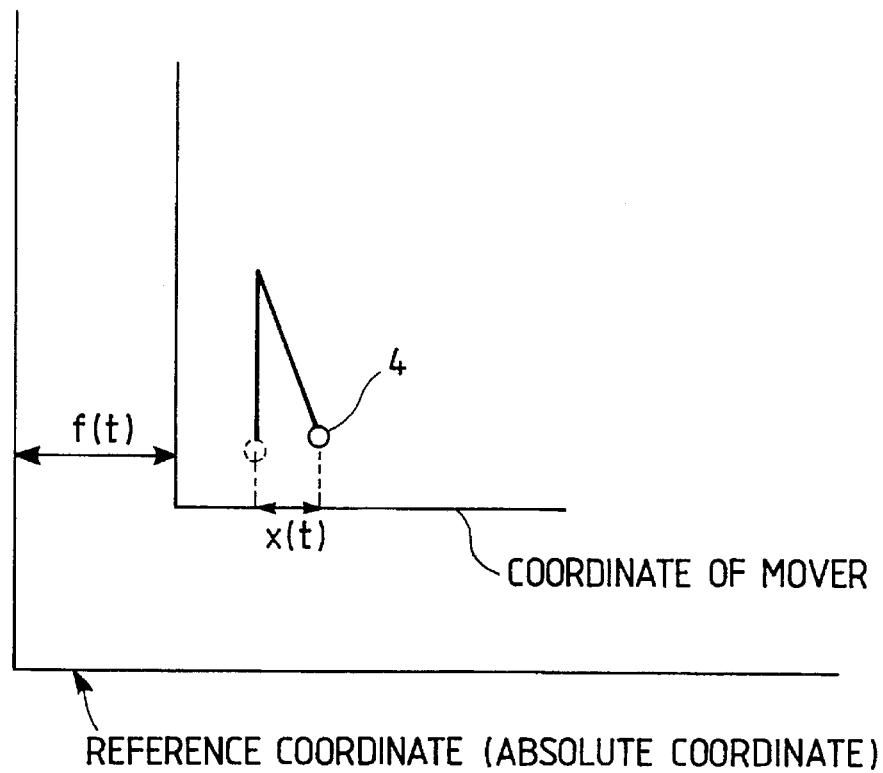
FIG. 4 is a schematic drawing showing the principle of the search for a sensed object by an operation unit.

The arithmetic controller 5 resets the rectangular coordinate position of the displacement sensor 4 to a reference coordinate position (0, 0) by the removal sensing signal supplied thereto, as shown in FIG. 4. After the coordinate position of the displacement sensor 4 is reset to the reference coordinate position (0, 0), the displacement of the position of the operation unit 1 relative to the automobile 50, i.e., the displacement of the position of the owner of the automobile who carries the operation unit 1, relative to the automobile 50, is successively sensed by the displacement sensing member such as an acceleration sensor or the like to generate displacement information which is then supplied to the arithmetic controller 5. If the displacement of the position of the owner of the automobile relative to the automobile on the basis of the reference coordinate position (0, 0) of the displacement sensor 4 is f(t), and the displacement of the displacement sensing member such as an acceleration sensor, which is contained in the displacement sensor 4 of the operation unit 1, is x(t), the following equation is established:

$$\frac{d^2x}{dt^2} + 2\epsilon \frac{dx}{dt} + n^2 x(t) = -\frac{d^2 f(t)}{dt^2}$$

wherein $\epsilon$ and n are each a constant.

Assuming that x=0 at t=0 or x≠0 and (dx/dt)=0 at t=τ, displacement f is represented as follows:

$$f = -\int_0^\infty \int_0^t x(\tau') \, d\tau' \, dt$$

The displacement f of the position of the owner of the automobile relative to the automobile can be calculated from displacement x(t) of the displacement sensing member such as an acceleration sensor or the like.

The controller 5 performs a necessary operation based on the displacement information supplied from the displacement sensor 4, and the absolute direction signal supplied from the absolute direction sensor 2 comprising a geomagnetic sensor, e.g. the absolute direction signal which indicates due north, to generate direction indicating information which indicates the direction in which the automobile 50 is present, with respect to the position of the owner of the automobile (the position of the operation unit 1).

When the owner of the automobile directs the display 6 to display the direction indicating information by operating the manual operation element 7 of the operation unit 1 in order to know the present position of the owner's own automobile 50, the controller 50 supplies the present direction indicating information to the display 6 based on the operation of the manual operation element 7. As a result, the contents of the direction indicating information supplied, i.e., the direction to the present position of the automobile 50, the approximate distance thereto, etc., are displayed.

The owner of the automobile can immediately know the direction to the position of the automobile 50 and the distance thereto on the basis of the position of the owner by seeing the contents displayed on the display 6 of the operation unit 1, without the need for searching for the parked automobile 50 by walking about.

Figure 2:
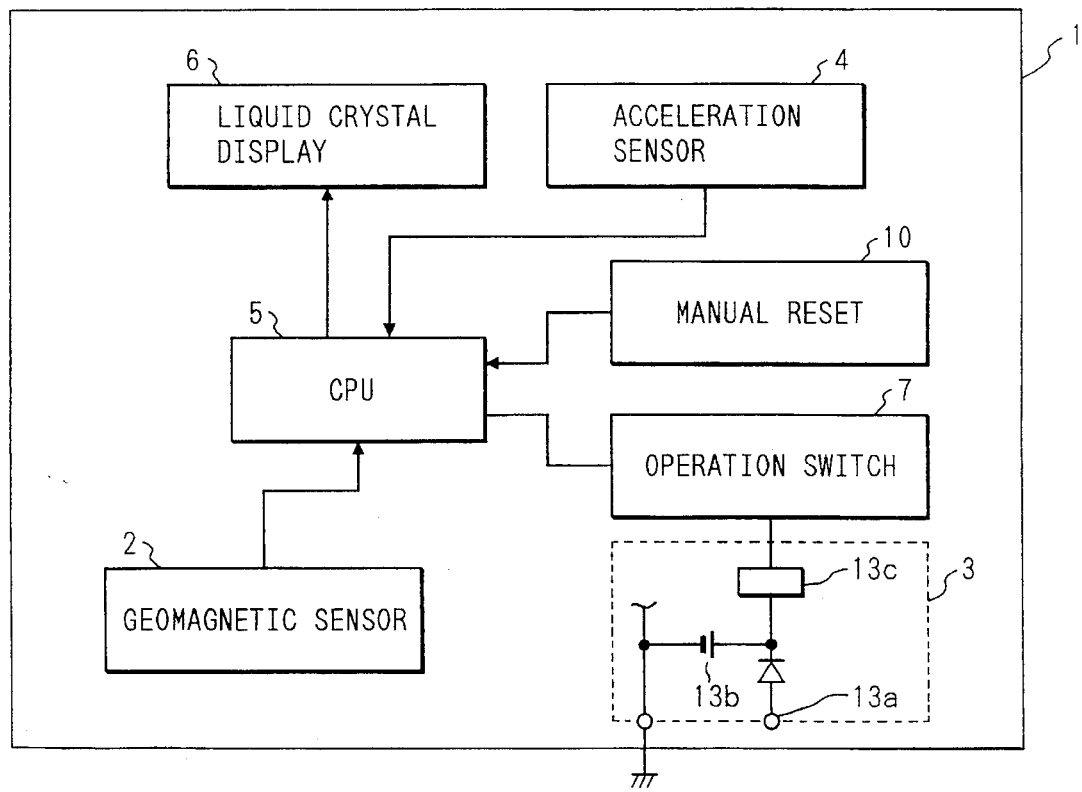
FIG. 2 is a block diagram showing details of the embodiment shown in FIG. 1.

FIG. 2 is a block diagram showing details of the embodiment shown in FIG. 1.

In FIG. 2, reference numeral 10 denotes a manual reset; reference numeral 13a, a battery terminal; reference numeral 13b, a battery power source; and reference numeral 13c, an automatic switch. Components equivalent to the components shown in FIG. 1 are denoted by the same reference numerals.

As shown in FIG. 2, the operation unit 1 comprises a geomagnetic sensor 6 serving as an absolute direction sensor, a separation sensor 3, an acceleration sensor 4 serving as a displacement sensor, CPU 5 serving as an arithmetic controller, a liquid crystal display 6 serving as a display, an operation switch 7 serving as a manual operation element, and a manual reset 10. The removal sensor 3 comprises a battery terminal 13a, a battery power source 13b and an automatic switch 13c.

The searching operation of this embodiment will be described in further detail below with reference to FIG. 2.

When the owner of the automobile is in the automobile, the operation unit 1 is placed at the predetermined storage position in the automobile 50. At the storage position, the battery charger 5 is installed for constantly supplying a source voltage to the battery charger 13b of the operation unit 1 through the battery terminal 13a.

When the owner having the operation unit 1 leaves the automobile 50, i.e., when the operation unit 1 is removed from the predetermined storage position in the automobile 50, the voltage supplied from the battery charger of the automobile to the battery power source 13b through the battery terminal 13a is cut off, and the battery charger is switched to the battery power source 13b in the operation unit 1. The automatic switch 13c automatically senses the removal of the operation unit 1 from the predetermined storage position in the automobile and generates the removal sensing signal which is supplied to the CPU 5. When the removal sensing signal is supplied to the CPU 5, the CPU 5 automatically resets the coordinate position of the acceleration sensor 4 to (0, 0).

A manual reset 10 may be provided for permitting manual reset in place of automatic reset. If the manual reset 10 is provided, when the operation unit 1 is loaded in the automobile, it is possible to realize a simple navigation system for knowing the distance of the automobile from the start position on the basis of the present position of the automobile.

As described above, in this embodiment, when the owner of an automobile desires to know the present position of the automobile, the direction and approximate distance of the automobile from the position of the owner of the automobile (the position of the operation unit 1) can be displayed on the display 6 on the basis of the displacement information output from the displacement sensor 4 in the operation unit 1 and the absolute direction signal output from the absolute direction sensor 2. Thus, the owner can immediately know the present position of the automobile without walking for searching for the position where the automobile is parked.

In this embodiment, it is sufficient to provide only the operation unit 1 on the side of the sensed object, for example, on the automobile side, without providing any searching device, thereby simplifying the entire structure of the apparatus for searching for the sensed object, and the structure of the operation unit 1.

Since the embodiment uses a displacement sensing member such as an acceleration sensor or the like as the displacement sensor 4 of the operation unit 1, displacement information can be generated without the movement of the operation unit 1 by the owner of the automobile.

The embodiment shown in FIG. 2 permits the constant supply of a stable operating voltage to the operation unit 1 from the battery power source of an automobile even if no battery power source is provided on the operation unit 1.

In the embodiment shown in FIG. 2, the removal sensor 3 comprises a switch for turning on and off the connection between the battery terminal 13a and the battery charger 51 of the automobile, and the removal sensing signal is generated by switching the switch.

Although the above embodiment relates to a case where the sensed object is an automobile, the sensed object in accordance with the present invention is not limited to the automobile. The present invention can, of course, be applied to any other similar objects which are movable like an automobile.

As described above, the present invention permits the display of the direction and approximate distance of a sensed object, e.g., an automobile, from the position of a person, e.g., the owner of the automobile, having the portable operation unit 1, on the basis of the displacement information output from the displacement sensor 4 in the operation unit and the absolute direction signal output from the absolute direction sensor 2, for example, when the owner desires to know the position of the automobile. The invention thus has the effect that the person having the operation unit 1 (the owner of the automobile) can immediately know the position of the sensed object (the position where the automobile is parked) by simply seeing the contents displayed on the display element 6 without walking about for searching for the sensed object.

The present invention also makes the portable operation unit 1 enough for the apparatus for searching for the sensed object without any other searching units provided on the side of the sensed object, for example, the automobile side. The present invention thus has the effect of simplifying the entire structure of the apparatus for searching for the sensed object and the structure of the operation unit 1.

What is claimed is:

1. An apparatus for searching for a sensed object comprising;

a portable operation unit;

an absolute direction sensor contained in said operation unit and generating an absolute direction signal which indicates an absolute direction;

a removal sensor for sensing a removal of said operation unit from said sensed object;

a displacement sensor for sensing the state of displacement of said operation unit after said operation unit is removed from said sensed object to generate displacement information;

an arithmetic controller for generating direction indicating information which indicates the direction in which said sensed object is present, based on said displacement information and said absolute direction signal; and a display for displaying contents of said direction indicating information.

2. An apparatus for searching for a sensed object according to claim 1, wherein said absolute direction sensor comprises a geomagnetic sensor.

3. An apparatus for searching for a sensed object according to claim 1, wherein said displacement sensor comprises a displacement sensing member such as an acceleration sensor or a pendulum.

4. An apparatus for searching for a sensed object comprising:

a portable operation unit;

an absolute direction sensor contained in said operation unit and generating an absolute direction signal indicating an absolute direction;

a removal sensor for automatically sensing a removal of said operation unit from said sensed object;

a displacement sensor for sensing the state of displacement of said operation unit after said operation unit is removed from said sensed object;

an arithmetic controller generating direction indicating information which indicates the direction in which said sensed object is present, based on said displacement information and said absolute direction signal;

a display for displaying contents of said direction indicating information; and a manual operation element for controlling the contents displayed on said display through said controller.

5. An apparatus for searching for a sensed object comprising:

a portable operation unit;

an absolute direction sensor contained in said operation unit and generating an absolute direction signal indicating an absolute direction;

a charging battery serving as a power source for said operation unit;

a displacement sensor for charging said charging battery when said operation unit is loaded on said sensed object provided with a charging element, and sensing the state of displacement of said operation unit by operating a manual reset to generate displacement information;

an arithmetic controller generating direction indicating information which indicates the direction where said sensed object is present, based on said displacement information and said absolute direction signal; and a display for displaying the contents of said direction indicating information.

6. An apparatus for searching for a sensed object comprising:

a portable operation unit;

an absolute direction sensor contained in said operation unit and generating an absolute direction signal indicating an absolute direction;

a charging battery serving as a power source for said operation unit and having a terminal;

a displacement sensor for charging said charging battery when said operation unit is loaded on said sensed object provided with a charging element, and sensing the state of displacement of said operation unit by operating a manual reset to generate displacement information;

an arithmetic controller generating direction indicating information which indicates the direction where said sensed object is present, based on said displacement information and said absolute direction signal; and a display for displaying the contents of said direction indicating information;

wherein when the terminal of said operation unit is removed from the charging element of said sensed object, a voltage supplied from said charging element is cut off, and the coordinate position of said displacement sensor is automatically returned to an initial position.

* * * * *